United States Patent [19]

Theodore et al.

[11] Patent Number: 4,645,791
[45] Date of Patent: Feb. 24, 1987

[54] ENVIRONMENTALLY DURABLE ELASTOMER COMPOSITION WITH EXCELLENT LOW TEMPERATURE DYNAMIC PROPERTIES

[75] Inventors: Ares N. Theodore, Farmington Hills; Paul C. Killgoar, Jr., Livonia, both of Mich.

[73] Assignee: Ford Motor Company, Dearborn, Mich.

[21] Appl. No.: 747,625

[22] Filed: Jun. 24, 1985

[51] Int. Cl.$^4$ .............................................. C08K 5/01
[52] U.S. Cl. .................................... 524/490; 524/491
[58] Field of Search ............... 524/490, 491, 481, 483; 526/281

[56] References Cited

U.S. PATENT DOCUMENTS

| | | |
|---|---|---|
| 267,594 | 11/1882 | Rose . |
| 2,035,988 | 3/1930 | Seabury et al. . |
| 3,080,596 | 3/1963 | Symbolik . |
| 3,171,699 | 3/1965 | Maxey . |
| 3,384,580 | 3/1968 | Peace . |
| 3,794,611 | 2/1974 | Brice .................................. 524/491 |
| 4,103,385 | 8/1978 | Porter . |
| 4,224,196 | 9/1980 | Gursky ................................ 524/491 |

FOREIGN PATENT DOCUMENTS

1147577 2/1969 United Kingdom .

OTHER PUBLICATIONS

Ribbed Design Makes Extrusion Possible, Rubber & Plastic News, Jan. 3, 1983, p. 3.
De-smearing Wiper Blades, Morning News, Aug. 5, 1982.

Primary Examiner—Paul R. Michl
Assistant Examiner—Alex H. Walker
Attorney, Agent, or Firm—Lorraine S. Melotik; Roger L. May

[57] ABSTRACT

This invention relates to an environmentally durable composition which has excellent low temperature dynamic properties. The composition comprises a substantially homogeneous mixture of 100 parts by weight elastomer having a fully saturated backbone, curing agent for the elastomer in amounts sufficient to crosslink the elastomer, reinforcing particulate filler and at least 20 parts by weight of an aliphatic oil. The aliphatic oil modifies the low temperature dynamic properties of the elastomer. Particulate graphite may be incorporated into the composition to lower its friction.

18 Claims, No Drawings

ENVIRONMENTALLY DURABLE ELASTOMER COMPOSITION WITH EXCELLENT LOW TEMPERATURE DYNAMIC PROPERTIES

TECHNICAL FIELD

This invention relates to an environmentally durable elastomer composition which has excellent low temperature dynamic properties. More particularly, the elastomer composition comprises elastomer having a fully saturated backbone, curing agent for the elastomer, reinforcing particulate filler and aliphatic oil.

BACKGROUND ART

Elastomer compositions made of natural rubber generally have good low temperature dynamic properties. However, because elastomers like natural rubber have unsaturated backbones, they are subject to chemical changes caused by environmental attack of the composition by, e.g., ultraviolet light, heat, oxygen, and ozone during use. These chemical changes in the elastomer, generally by means of reactions at the unsaturated sites, change its physical properties. Consequently, the composition begins to harden and takes a set. If such a composition has been used to form, e.g., wiper blades, the blades will no longer conform well to the windshield curvature. In order to overcome problems associated with poor environmental durability, elastomer compositions have been made from elastomers, such as ethylene-propylene-diene rubber (EPDM), which have a fully saturated backbone. Since these elastomers do not possess any reactive sites in their backbone, compositions comprising them possess excellent environmental degradation resistance. One such composition, employed for windshield wiper blades, is disclosed by Killgoar, Jr. in U.S. application Ser. No. 573,971, entitled "An Improved Windshield Wiper Material", filed Dec. 27, 1983, now abandoned, and assigned to the assignee of this invention. The windshield wiper composition disclosed therein comprises elastomer having a fully saturated backbone, curing agent, reinforcing particulate and graphite. The graphite is incorporated into the windshield wiper composition to reduce the coefficient of friction of the blade material.

However, at temperatures below about 0° C., such elastomer compositions, while having excellent environmental durability, display dynamic properties (i.e., flexibility) that are generally inferior to those of many natural rubber compositions. The properties of the elastomer compositions may be modified by incorporating additives into the composition. However, the inclusion of a particular additive into the composition may improve one property of the composition while having a deleterious effect on another property. For example, naphthenic oils, which are generally added to improve the processing of the compositions, generally degrade the low temperature dynamic properties of the elastomer composition.

BRIEF DESCRIPTION OF THE INVENTION

This invention is directed to an environmentally durable elastomer composition which has excellent low temperature dynamic properties. The composition comprises a substantially homogeneous mixture of: (a) 100 parts by weight elastomer having a fully saturated backbone, (b) curing agent for the elastomer in an amount sufficient to crosslink the elastomer, (c) reinforcing particulate filler, and (d) at least 20 parts by weight, more preferably between about 30–90 parts by weight, aliphatic oil selected from aliphatic oils having a number average molecular weight ($\overline{M}_n$) of between about 250 and about 1500, wherein at least 90% by weight, preferably greater than about 98% by weight of the aliphatic oil boils above about 200° C. The aliphatic oil can optionally include small amounts of additives conventional to such oils, e.g., antioxidants, viscosity index improvers and defoamants, which are compatible with the oil and substantially non-reactive with the elastomer composition.

The elastomer composition of this invention may be employed as a windshield wiper material. If such use is desired, particulate graphite is preferably incorporated into the composition of this invention to modify its frictional properties. Preferably, when the composition of this invention is employed as a windshield wiper composition, the elastomer having a saturated backbone comprises or consists essentially of ethylene-propylene-diene rubber (EPDM), the curing agent comprises an accelerated sulfur curing system, and the reinforcing filler comprises carbon black. The aliphatic oil is included in the wiper composition in an amount of between about 20 and about 100 parts by weight and the friction modifying graphite is included in an amount of between about 20 and about 100 parts by weight (the weight of the aliphatic oil and graphite individually being based on 100 parts by weight of the EPDM).

Advantageously, cured materials made from the elastomer composition of this invention possess excellent environmental degradation resistance as well as improved low temperature dynamic properties. The compositions of this invention also exhibit improved processability due to the use of the aliphatic oils of this invention which have a low level (or absence) of volatile components.

DETAILED DESCRIPTION OF THE INVENTION

The invention of this application is directed to an environmentally durable elastomer composition which has excellent low temperature dynamic properties. The composition of this invention comprises a substantially homogeneous mixture of: elastomer having a fully saturated backbone, curing agent for the elastomer, reinforcing particulate filler, and aliphatic oil. Each of these components, as well as optional materials which may be included in the composition, will be discussed hereinafter in detail.

The composition of this invention comprises elastomer having a fully saturated backbone, i.e., elastomer wherein a continuous path can be traced from one end of the elastomer polymer to the other without going through a double bond. Many such elastomers having a fully saturated backbone are known to one skilled in the art. Exemplary of numerous such elastomers having a fully saturated backbone which may be employed in the composition of this invention are ethylene-propylenediene rubber (EPDM), commercially available as Epcar (trademark, Polysar Ltd., Sarnia, Canada), Vistalon (trademark, Exxon, Houston Tex.), Nordel (trademark, DuPont, Wilmington, Del.), and Epsyn (trademark, Copolymer Rubber Chemicals Corp., Baton Rouge, LA.). Other suitable elastomers having a saturated backbone include ethylene propylene rubber, available, e.g., as Epcar (trademark), Royalene (trademark, Uniroyal, Naugatuck, Conn.), Vistalon (trademark), and Epsyn (trademark). Saturated nitrile elastomers which may similarly be employed include, but are not limited to, Therban (trademark, Mobay Chemical, Pittsburg, Pa.). Still other elastomers having a saturated backbone comprise chlorosulfonated polyethylene, available commercially as Hypalon, (trademark, DuPont).

The elastomer employed in the composition of this invention may be a mixture of two or more different elastomers having a fully saturated backbone, such as those described above. In addition to the elastomer having a fully saturated backbone, the composition of this invention may include a minor proportion of elastomer having an unsaturated backbone, e.g., polyisoprene or bromobutyl rubber, as a modifying elastomer. However, in order to maintain maximum environmental durability of the composition, it is most preferable not to include any such elastomers having an unsaturated backbone in the composition.

The composition of this application also includes curing agent for the elastomer in an amount which is sufficient to crosslink the elastomer. As would be apparent to one in the art, if elastomer having an unsaturated backbone is included in the composition of this invention, sufficient curing agent would be employed to cure the elastomer having the fully saturated backbone and the elastomer having an unsaturated backbone. The selection of the particular curing agent and the optimal amount to be employed for a particular elastomer composition is dependent upon, e.g., desired physical properties and compatibility with the process used to form the cured composition, as is known to those skilled in the art, and thus such selection would be within the skill of those in the art. Typically, such curing agents include, but are not limited to, sulfur systems, e.g., conventional sulfur, efficient and semi-efficient accelerated sulfur systems, peroxide curing agents, etc. Such systems are well known in the art, and are widely described in literature, e.g., "Vulcanization and Vulcanizing Agents", W. Hoffman, Maclaren and Sons Ltd., London, 1967, which is hereby expressly incorporated by reference in this application for such teachings.

Another component of the composition of this invention is reinforcing particulate filler, which comprises organic or inorganic particulate, or mixtures thereof. Examples of preferred organic and inorganic particulate include carbon black, zinc oxide, fine particle calcium carbonates, silicas and silicates. The amount and type of reinforcing filler to be employed in the composition of this invention would be based on the desired properties and use of the elastomer composition of this invention. Selection of the optimal amount and type of filler to be employed would be within the skill of one in the art.

As discussed above, the excellent low temperature dynamic properties of the elastomer composition result from the inclusion of aliphatic oil in the composition. At least 20 parts by weight of the oil is included in the composition based on 100 parts by weight of the elastomer having a fully saturated backbone. Preferably, the amount of aliphatic oil included in the composition is between about 30 and 90 parts by weight based on 100 parts by weight of the elastomer having a fully saturated backbone, which is employed in the composition. This oil is selected from aliphatic oils having a number average molecular weight ($\overline{M}_n$) of between about 250 and about 1500, preferably a number average molecular weight ($\overline{M}_n$) of between about 350 and 700. Additives which are compatible with the oil may be included in the aliphatic oil as long as such additives are substantially non-reactive with the elastomer composition. Aliphatic oils which are suitable for use in the present invention have a very low volatile content, i.e., at least 90% by weight, preferably greater than about 98% by weight of the aliphatic oil boils above 200° C. These aliphatic oils, in addition to modifying the low temperature dynamic properties of the elastomer composition of the invention also improve its processability. As is known in the art, the processibility of an elastomer composition is related to such factors as its ability to be easily molded, e.g., due to the softness and flowability of the composition, and to the ability of the composition to be loaded with reinforcing particulate such as carbon black. While naphthenic oils may be incorporated into an elastomer composition to improve its processability, naphthenic oils are volatile at the processing/curing temperatures of the composition and thus create voids in the composition product when they volatilize. The aliphatic oils of the present invention, on the other hand, improve the processability of the elastomer composition and do not produce undesirable voids in the composition product since the aliphatic oils have a low level (or absence) of oil components which are volatile at the curing temperature of the composition (which is generally between about 150°–180°). Exemplary of the aliphatic oils which may be employed in this invention are synthetic paraffinic mineral oils, including synthetic hydrocarbon basestock lubricating oils, available, e.g., from Mobil Oil Corporation. Mobil's synthetic hydrocarbon basestock lubricating oil was found to lose only about 0.08% of its weight when heated at 160° C. for 700 minutes. Such synthetic basestock lubricating oils, or blends of such synthetic basestock lubricating oils, which have been modified for use as engine oils by the incorporation of an additive system may also be employed as the aliphatic oil in this invention. (Generally this additive system provides high detergency and dispersancy and resistance to thermal and oxidative instability, and offers wear and corrosion protection, as required during engine use). Exemplary of such engine oils which may be employed as the aliphatic oil of the composition of this invention include, but are not limited to, those available from Mobil Oil Corp., e.g., Mobil 1 (trademark) synthetic motor oil and Delvac 1 (trademark) synthetic fleet engine oil. The aliphatic oil employed in this invention may be a mixture of aliphatic oils comprising, e.g., such synthetic hydrocarbon basestock lubricating oils and/or synthetic engine oils.

As discussed above, the composition of this invention may also be employed as a windshield wiper composition. Preferably, for this use, the saturated backbone elastomer comprises EPDM and employs an accelerated sulfur curing system. The reinforcing particulate in such a windshield wiper composition preferably comprises carbon black, generally in an amount of between about 15 and about 100 parts by weight, based on 100 parts by weight of the elastomer having a fully saturated backbone. The preferred carbon blacks for use in the windshield wiper composition have an average particle size of 20–60 nm (nanometers) and are employed most preferably in the composition in an amount of from about 50 to 70 parts by weight per hundred parts by weight of such elastomer.

As taught above, when employing the present invention composition to make windshield wiper blades, graphite is preferably incorporated into the elastomer composition in order to reduce the coefficient of friction of the windshield wiper. In order to reduce the friction of the blades, preferably at least about 20 parts by weight particulate graphite is incorporated in the elastomer composition (based on 100 parts by weight of elastomer having a fully saturated backbone). In one preferred embodiment of the windshield wiper elastomer composition, wherein the elastomer having a fully saturated backbone comprises EPDM, the elastomer composition preferably comprises between about 20 and about 100 parts by weight particulate graphite per 100 parts by weight of EPDM. The particle size of the graphite employed in the windshield wiper composition is not limited to any particular particle size. Mixture of particle sizes may also be employed. More particularly, the optimal particle size to be employed in the composition would be suggested in part, by the method of manufacture of the blades. Selection of preferred particle size would be within the skill of those in the art. Graphite is readily commercially available as, for example, Dixon 1176 and Dixon 200-42 (trademark, The Joseph Dixon Crucible Co., Jersey City, N.J.). Aliphatic oil is included in the windshield wiper composition in an amount of at least 20 parts by weight as discussed above based on the weight of the elastomer having the fully saturated backbone. Preferably, when the elastomer having the fully saturated backbone is EPDM, the aliphatic oil is included in the windshield wiper composition in an amount of between about 20 and about 100 parts by weight, based on 100 parts by weight of the EPDM.

The elastomer composition of this invention may optionally include other materials commonly employed in such formulations. These optional materials include non-reinforcing fillers such as CaCO$_3$, clay, etc., cure activators such as stearic acid and zinc oxide; and other additives such as dessicants like CaO. Still other materials like antioxidants may be included in the composition. While it is known that, e.g., in compounding ethylene-propylene type rubbers, added antioxidants may not be required, they may be beneficial in many cases. Antioxidants include, e.g., polymerized quinolines, hindered amines, phenols and the like known in the art. Selection and amount of optimal materials which would be employed in the composition would be dependant on the use and desired properties of the composition. As such, their selection would be within the skill of those in the art in view of the present disclosure.

The composition of this invention may be employed to make, e.g., windshield wiper blades and ring seals, as would be apparent to those skilled in the art. In making an article from the composition, the elastomer composition is first mixed together to form a substantially homogeneous mixture, generally in a Bandbury type mixer or on two roll rubber mills, generally the curing agent being incorporated last, whereafter the composition is formed into the article and cured. Alternatively, the composition may be formed and cured whereafter the article is formed from the cured elastomer. The method of making the composition and forming the article from the composition is not limited to any particular method.

The following test methods were employed in evaluating the compositions described in the examples set forth below.

TESTING METHODS

Tensile testing of dumbell Specimens: ASTM D 412 procedure is used for determination of tensile strength and elongation to break. Dumbbell specimens are cut with the standard die C from a thin slab (0.25-0.35 cm thick) and used for this testing.

Tear testing: Tear specimens, cut with a die B, are tested according to ASTM D 624 procedure. Razor-nicked specimens are used for determination of tear resistance.

Durometer Hardness: The hardness of compression set buttons is determined according to ASTM D 2240 procedure.

Compression set, %: Compression set testing was done according to ASTM D 395 (method B) on compression set buttons. The test conditions were 22 hours at 85° C. under 25% compression in a ventilated, air circulating oven.

Dynamic Mechanical Properties Dynamic properties such as Log E' (storage modulus), Log E" (loss modulus) and Tan δ (loss tangent) were obtained with a Dynamic Mechanical Thermal Analyzer (Polymer Laboratories Limited). The dual cantilever mode of testing was used with the specimen in the form of a rectangular bar. Typical bar dimensions were: length 7.00 mm, width 6.45 mm and thickness 2.70 mm. The specimens were cooled to −120° C. and then heated at 1° C. per minute from −90° C. to +25° C. The dynamic mechanical thermal analyzer was interfaced with a Hewlett Packard 9816 computor and 7475A plotter. Log E', Log E", and Tan δ were plotted as a function of temperature. Testing was carried out at frequencies of 0.1, 1.0 and 10 HZ.

The invention will be further understood by referring to the following detailed examples. It should be understood that the specific examples are presented by way of illustration and not by way of limitation.

EXAMPLE 1

The following ingredients in the amounts indicated are employed in preparing an elastomer compound according to the invention, which compound is suitable for manufacture of windshield wiper blades.

| | |
|---|---|
| Epcar 585[1] | 387.00 g |
| Carbon black (N-347[2]) | 154.80 g |
| Stearic acid | 3.90 g |
| Zinc oxide | 19.40 g |
| Synthetic hydrocarbon basestock lubricating oil[3] | 232.20 g |
| Dixon 200-42[4] | 232.20 g |
| 2-mercapto benzotriazole | 7.74 g |
| Tetramethylthiuran disulfide | 3.10 g |
| Telluriumdiethyldithiocarbomate | 3.10 g |
| #104 Rubbermakers[5] | 3.10 g |
| Dipentamethylene thiuram hexasulfide | 3.10 g |
| Calcium oxide | 19.40 g |

[1]Trademark, Polysar Ltd., EPDM
[2]ASTM Designation
[3]Obtained from Mobil Oil Corp.
[4]Trademark, The Dixon Graphite Co., particulate graphite
[5]Trademark, Harwick Chemical Corp., Akron, Ohio, Co., sulfur The above ingredients were mixed in a Banbury mixer (model BR) using the following six minute mixing schedule. Initially, all dry ingredients were mixed with the Mobil synthetic hydrocarbon basestock lubricating oil for one minute. EPDM was added to the mixture and mixing was continued for four additional minutes. Then the curatives were added to the mixture and mixing was continued for one more minute. The resulting compound A was further mixed on a 200×400 mm two-roll mill while it was still warm. Thermal gravimetric analysis indicated that this compound A has a 0.40% weight loss. A similar compound B containing a conventional processing oil (Circosol 4240, tradename, Sun Petroleum Products, a naphthenic oil) in place of the aliphatic oil, had a weight loss of 1.15%. The lower weight loss of volatile components from compound A results in better quality of molded parts.

After determining the cure properties of the compound on an oscillating disk rheometer (Monsanto 900), slabs and compression set buttons were molded from compound A and compound B at 160° C. for 24 and 29 minutes respectively. The physical properties of compound A and compound B are listed below:

| Compound | Hardness, Duro A | Compression Set, % | Tensile Strength, MPa | Elongation, % | Tear Strength, KN/M |
| --- | --- | --- | --- | --- | --- |
| Compound A | 57 | 15 | 9.70 | 380 | 28.00 |
| Compound B | 56 | 18 | 9.60 | 398 | 29.70 |

Although the above compounds have similar physical properties, their low temperature dynamic mechanical properties are substantially different. Compound A exhibits superior low temperature flexibility as shown by the Tan δ value (peak) in the table below.

| Compound | LogE', Pa (1 HZ, 20° C.) | Tan δ (1 HZ, Peak °C.) |
| --- | --- | --- |
| Compound A | 6.90 | −51° C. |
| Compound B | 6.95 | −35° C. |

The low temperature flexibility of compound A is not only better than that of compound B but also at least equivalent to that of a production natural rubber compound.

A strip of compound A (85.00 g) was placed in the cavity of a compression mold for the preparation of windshield wiper blades. The material was cured for 28 minutes at 160° C. The resulting blades had a smooth surface and no defects were present in their interior section.

EXAMPLE 2

The procedure of Example 1 was repeated with the exception that 116.10 g carbon black (N-347, ASTM designation) were employed in preparing the compound. The mix was molded under similar conditions and exhibited good physical properties. Although the Tan δ (peak=−51° C.) was the same as that for compound A of Example 1, the dynamic modulus (Log E' at 20° C.) was lower (6.75 Pa) than that of compound A. Windshield wiper blades molded from this material had a smooth surface and no defects. The low temperature flexibility of these blades was excellent.

EXAMPLE 3

Example 1 was repeated with the following differences: 116.10 g carbon black (N-347, ASTM designation) and 193.50 g synthetic hydrocarbon basestock lubricating oil (available from Mobil Oil Corp.) were employed in preparing the mix. This compound was molded at 160° C. for 24 minutes and the slabs exhibited good physical properties and had no bubbles in the surface or the interior of molded parts. The dynamic mechanical properties of this compound in the temperature range −90° to −20° C. were similar to those of compound A of Example 1. This compound had low weight loss at 160° C. for 30 minutes as did compound A of Example 1. Windshield wiper blades prepared from this mix had a smooth surface. These blades exhibited good durability and low friction.

EXAMPLE 4

The procedures of Example 3 were repeated with the exception that the Mobil synthetic hydrocarbon basestock lubricating oil was replaced by an equal amount of Mobil 1 (trademark, Mobil Oil Corp.) motor oil. The composition had very low weight loss when heated at 160° C. for 30 minutes (0.75%) and resulted in molded parts without defects. Windshield wiper blades molded from this compound had a smooth surface and no defects.

EXAMPLE 5

Example 2 was repeated with the single exception that the Mobil synthetic hydrocarbon basestock lubricating oil was replaced by an equal amount of commercially available Delvac 1, (trademark Mobil Oil Corp.) synthetic fleet engine oil. The physical and dynamic mechanical properties of this compound are close to those of the compound of Example 2 based on Mobil's synthetic hydrocarbon basestock lubricating oil. Compression molded parts exhibited good surface appearance and no defects.

EXAMPLE 6

The procedures of Example 1 are repeated with the exception that Epcar 585 (trademark, Polysar Ltd.) was replaced by an equal amount of Epsyn 5509 (trademark, Copolymer Rubber Chemicals Corp., EPDM). The ingredients are mixed and molded parts could be obtained from this compound. This compound is also suitable for preparation of extruded parts.

EXAMPLE 7

Example 1 was repeated with the exception that the graphite (Dixon 200-42, trademark, The Joseph Dixon Co.) was replaced by an equal amount of a coarser graphite (Dixon 1176, trademark, The Joseph Dixon Graphite Co.). The molded parts had good physical properties and appearance.

EXAMPLE 8

The procedures of Example 1 were repeated with the following difference. The amount of graphite (Dixon 200-42, trademark, The Joseph Dixon Graphite Co.) was reduced to 75 grams. The molded parts exhibited good physical properties and reduced friction values.

EXAMPLE 9

Example 2 was repeated with the exception that the aliphatic oil (Mobil's synthetic hydrocarbon basestock lubricating oil) was replaced by an equal amount of Di(butoxy-ethoxy-ethyl) formal plasticizer (Thiokol, Wilmington, Del.). The dispersion of ingredients was slightly inferior to that of the compound described in Example 2.

EXAMPLE 10

The procedures of Example were repeated with the following differences. The amount of carbon black (N-347, ASTM designation) was reduced to 75 grams and the amount of graphite (Dixon 200-42, trademark, The Joseph Dixon Graphite Co.) was increased to 290 grams. The resulting compound exhibited low volatility at 160° C. for 30 minutes (0.50%). Molded parts displayed excellent low temperature flexibility.

EXAMPLE 11

Example 1 was repeated with the exception that the following amounts of curatives are employed in preparing the compound:

| | |
|---|---|
| 2-mercaptobenzotriazole | 8.5 g |
| Tetramethylthiuram disulfide | 3.9 g |
| Tellurium diethyldithiocarbamate | 3.10 g |
| Sulfur | 1.50 g |
| Dipentamethylene thiuram hexasulfide | 3.10 g |

This compound exhibited good low temperature flexibility.

EXAMPLE 12

An elastomer compound was prepared by mixing the following ingredients in a banbury mixer.

| | |
|---|---|
| Epcar 585[1] | 500.00 g |
| Carbon black (N-351[2]) | 300.00 g |
| Stearic acid | 5.00 g |
| Zinc oxide | 25.00 g |
| synthetic hydrocarbon basestock lubricating oil[3] | 300.00 g |
| 2-mercapto benzothiazole | 10.00 g |
| Tetramethylthiuram disulfide | 4.00 g |
| Tellurium diethyl dithiocarbomate | 4.00 g |
| Sulfur | 4.00 g |
| Dipentamethylenethiuram hexasulfide | 4.00 g |
| Calcium oxide | 25.00 g |

The above mix was compression molded at 160° C. for 20 minutes. The molded parts exhibited good physical properties and good low temperature dynamic mechanical properties.

[1]Trademark, Polysar Ltd., EPDM
[2]ASTM designation
[3]Available from Mobil Oil Corp.

EXAMPLE 13

The following ingredients were mixed as in Example 1 for preparation of an EPDM natural rubber blend.

| | |
|---|---|
| Epcar 585[1] | 320.00 g |
| Natural rubber (SMR-5L[2]) | 60.00 g |
| Carbon black (N-347[3]) | 155.00 g |
| Stearic acid | 4.00 g |
| Zinc oxide | 20.00 g |
| Mobile synthetic hydrocarbon basestock lubricating oil[4] | 232.00 g |
| Dixon 200-42[5] | 232.00 g |
| 2-mercaptobenzothiazole | 7.75 g |
| Tetramethylthiuram disulfide | 3.10 g |
| Tellurium diethyldithiocarbomate | 3.10 g |
| Sulfur | 3.10 g |
| Dipentamethylenethiuram hexasulfide | 3.10 g |
| Calcium oxide | 19.40 g |

[1]Trademark, Polysar Ltd., EPDM
[2]Akron Chem. Co., Akron, Ohio
[3]ASTM Designation
[4]Available from Mobil Oil Corp.
[5]Trademark, The Joseph Dixon Graphite Co., graphite The compound was molded and exhibited good low temperature flexibility.

EXAMPLE 14

Example 13 is repeated with the exception that the natural rubber (SMR-5L) was replaced by an equivalent amount of butyl rubber (Butyl 268, trademark, Exxon Corp.). The compound was moldable and exhibited good properties.

While particular embodiments of the invention have been described, it will be obvious to those skilled in the art that various changes and modifications may be made without departing from the invention, and it is intended to cover in the appended claims all such modifications and equivalents as fall within the true spirit and scope of this invention.

We claim:

1. An elastomer composition comprising a substantially homogeneous mixture of:
   (a) 100 parts by weight of elastomer having a fully saturated backbone;
   (b) curing agent for said elastomer in amount sufficient to crosslink said elastomer; and
   (c) reinforcing particulate filler;
   said composition further comprising at least 20 parts by weight oil, substantially all oil included in said composition being selected from aliphatic oils and having a number of average molecular weight ($\overline{M}_n$) of between about 250 and about 1500, and wherein at least 90% by weight of said oil boils above about 200° C.

2. An elastomer composition according to claim 1, wherein greater than 98% by weight of said aliphatic oil boils above about 200° C.

3. An elastomer composition according to claim 1, wherein said aliphatic oil is included in said composition in an amount of between about 30 and about 90 parts by weight based on 100 parts by weight of said elastomer.

4. An elastomer composition according to claim 1, wherein said oil has a number average molecular weight ($\overline{M}_n$) of between about 350 and about 700.

5. An elastomer composition according to claim 1, wherein said aliphatic oil is selected from (i) synthetic paraffinic mineral oils, (ii) synthetic paraffinic mineral oil based engine oils, and (iii) blends thereof.

6. An elastomer composition according to claim 5, wherein said aliphatic oil is selected from synthetic hydrocarbon basestock lubricating oils and engine oils based on synthetic hydrocarbon basestock lubricating oils.

7. An elastomer composition according to claim 1, wherein said reinforcing particulate filler is selected from organic and inorganic particulate.

8. An elastomer composition according to claim 1, further comprising at least 20 parts by weight particulate graphite.

9. An elastomer composition according to claim 8, wherein said reinforcing particulate comprises carbon black.

10. An elastomer composition according to claim 9, wherein said composition comprises between about 15 and about 100 parts by weight carbon black.

11. An elastomer composition according to claim 8, wherein greater than 98% of said aliphatic oil boils above about 200° C.

12. An elastomer composition according to claim 8, wherein said oil has a number average molecular weight ($\overline{M}_n$) of between about 350 and about 700.

13. An elastomer composition according to claim 8, wherein said elastomer having a fully saturated backbone comprises ethylene-propylene-diene rubber.

14. An elastomer composition according to claim 13, wherein said curing agent for said elastomer comprises an accelerated sulfur curing system.

15. An elastomer composition according to claim 13, wherein said composition comprises between about 20 and about 100 parts by weight of said aliphatic oil.

16. An elastomer composition according to claim 15, wherein said aliphatic oil is selected from (i) synthetic paraffinic mineral oils, (ii) synthetic paraffinic mineral oil based engine oils, and (iii) blends thereof.

17. An elastomer composition according to claim 15, wherein said aliphatic oils are selected from synthetic hydrocarbon basestock lubricating oils and engine oils based on synthetic hydrocarbon basestock lubricating oils.

18. An elastomer composition suitable for use as windshield wiper material, which composition comprises a substantially homogeneous mixture of:

(a) 100 parts by weight ethylene-propylene-diene elastomer;
(b) curing agent for said elastomer;
(c) between about 15 and 100 parts by weight carbon black; and
(d) between about 20 and about 100 parts by weight particulate graphite;

said composition further comprising between about 20 and about 100 parts by weight oil, substantially all oil included in said composition being selected from aliphatic oils and having a number average molecular weight (Mn) of between about 250 and about 1500, and wherein at least 90% by weight of said oil boils above about 200° C.

* * * * *